United States Patent
Nose

(10) Patent No.: US 6,956,675 B2
(45) Date of Patent: Oct. 18, 2005

(54) METHOD, PROCESSOR AND PROGRAM FOR ERROR DIFFUSION MODIFIED WITH AM-FM SINE WAVE

(75) Inventor: Masaki Nose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 903 days.

(21) Appl. No.: 09/736,317

(22) Filed: Dec. 15, 2000

(65) Prior Publication Data

US 2001/0021275 A1 Sep. 13, 2001

(30) Foreign Application Priority Data

Mar. 10, 2000 (JP) ........................................ 2000-067562

(51) Int. Cl.$^7$ .......................... G06K 15/00; H04N 1/40; H04N 1/405
(52) U.S. Cl. ...................... 358/3.03; 358/3.04; 358/3.06
(58) Field of Search ......................... 358/1.9, 2.1, 2.99, 358/3.01, 3.03–3.06, 3.2, 3.21, 3.24, 3.26, 466; 345/616; 382/251–252, 260–265, 270, 272, 277

(56) References Cited

U.S. PATENT DOCUMENTS 5,822,464 A * 10/1998 Metcalfe .................... 382/252
6,173,081 B1 * 1/2001 Nishikawa ................. 382/252
6,449,061 B2 * 9/2002 Metcalfe .................... 358/3.05

FOREIGN PATENT DOCUMENTS

JP 9-65126 3/1997

OTHER PUBLICATIONS

Reiner Eschbach; "Reduction of artifacts in error diffusion by means of input–dependent weights"; Journal of Electronic Imaging; vol. 2(4); Oct. 1993; pp. 352–358.
Yasuhiko Kishimoto et al; "Improved error diffusion modified with AM/FM periodic noise"; IS&Ts NIP 15; 1999; pp 366–369.

* cited by examiner

*Primary Examiner*—Thomas D. Lee
*Assistant Examiner*—James A Thompson
(74) *Attorney, Agent, or Firm*—Armstrong, Kratz, Quintos, Hanson & Brooks, LLP

(57) ABSTRACT

The geometric texture and the graininess of an output image are improved in half tone processing using an error diffusion method. An image processing method where halftone processing is performed on input images using an error diffusion method including generating a sine wave where the amplitude and the frequency are modulated according to the average value of the target pixel value and the peripheral pixel values, adding the diffused quantization errors, the target pixel value and the sine wave, quantizing the addition result by a predetermined number of grayscale levels, and calculating the quantization errors of the peripheral pixels from the errors by quantization. By applying a disturbance sine wave by the error diffusion method, diffusion errors can be uniformly dispersed, and geometric texture and graininess can be improved.

11 Claims, 20 Drawing Sheets

FIG. 7A
mod(Avg, 255/(Q-1))
Q=2 (Binarize)
FIG. 7B
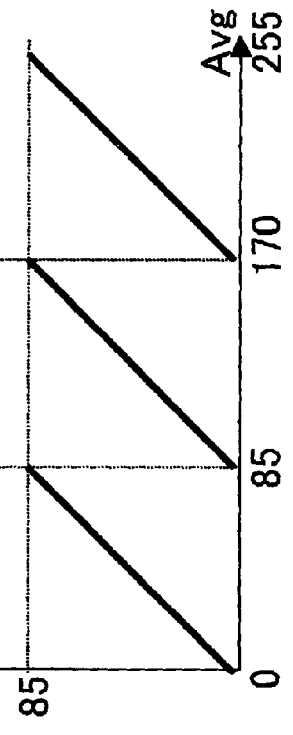
mod(Avg, 255/(Q-1))
Q=4 (Quaternary)
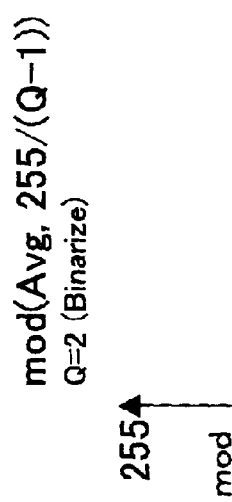

METHOD, PROCESSOR AND PROGRAM FOR ERROR DIFFUSION MODIFIED WITH AM-FM SINE WAVE

BACKGROUND OF THE INVENTION

1. Field of the Invention

The present invention relates to an image processing method, an image processor and a storage medium to perform half tone processing on input images using an error diffusion method, and more particularly to an image processing method, an image processor and a storage medium thereof wherein the geometric texture and graininess of output images are improved with the error diffusion method.

2. Description of the Related Art

Recently full color image processing has become possible with advances in color image processing technology. For example, processing with 256 grayscale levels is performed for each one of cyan C, magenta M and yellow Y. However, such a device as a display and a printer, to display and print these colors, cannot display or print full color images since the number of grayscale levels is limited. Therefore, such a device as a display and a printer, where the number of grayscale levels which can be reproduced is limited, converts a full color input image to a half tone image by the error diffusion method.

The error diffusion method uses an algorithm to obtain half tone images where grayscale is satisfactorily preserved by diffusing the quantization errors, which are generated when input images are quantized by the number of grayscale levels possible in the output device, into the peripheral pixels.

However, a shortcoming of the error diffusion method is the generation of geometric texture, such as the texture generated in the low density dot area (area where the density of block dots is low) of the output image (this texture is called "worm"), and the texture generated in the high density dot area (area where the density of black dots is high) (this texture is called "fingerprint"), and many improvements have been attempted in the prior art. The improvement techniques which have been proposed will be described below.

The first method is a two-way scan (Ulichney, 1987) which scans an input image in two ways, where worm is decreased since the diffusion direction of the quantization errors is dispersed in the low dot density area.

The second method is an error filter switching system, which switches the error filters to diffuse the quantization errors into the peripheral pixels (R. Eschbach, "Reduction of artifacts in error diffusion by means of input dependent areas", Journal of Electronic Imaging, 2 (4), pp. 352–358, (1993)). Depending on the input pixels and the peripheral pixels thereof, several types of error filters are used to decrease worm and fingerprint. Worm decreases as the filter to be used becomes larger in size.

A system combining the two-way scan system and the error filter switching system has also been proposed (e.g. Japanese Patent Laid-Open Application No. 9-65126).

The third method is a sine wave superimposing system (Y. Kishimoto, M. Nose, R. Saito and H. Kotera, "Improved error diffusion method with AM/FM periodic noise", Rroc. IS&T sNIP15, pp. 366–369 (1999)), where dots are corrected and arranged by superimposing a sine wave for modulating the amplitude and the frequency on the input pixel values before quantization processing. The volume of calculation is relatively low.

The above mentioned prior art, however, has the following problems.

In the first method, two-way scanning, worm is decreased since the diffusion direction of quantization errors is dispersed in the low dot density area, but fingerprint is amplified by the interference of quantization errors in the high dot density area.

In the second method, which is a combination of the error filter switching system and the two-way scan, geometric texture (worm and fingerprint) decreases but uniform cyclic dot patterns, such as half tone dots, cannot be created in the low dot density area, the graininess of dots becomes salient, and the color reproduction range does not improve.

In the third method, the sine wave superimposing system, sine waves are applied simply according to the intensity of the input level, so the edges of the output image become unclear, and images where density varies greatly cannot be improved very much.

With the above mentioned techniques alone, it is difficult to improve both worm and fingerprint simultaneously, and the indiscriminate combination of techniques merely increases the volume of calculation.

SUMMARY OF THE INVENTION

It is an object of the present invention to provide an image processing method, an image processor and a storage medium not only to prevent geometric texture, but also to prevent graininess from deteriorating.

It is another object of the present invention to provide an image processing method, an image processor and a storage medium to obtain images with low graininess, close to half tone dots, in a low dot density area.

It is still another object of the present invention to provide an image processing method, an image processor, and a storage medium to prevent unclear edges of an output image and to present the effect of error diffusion even for images with highly varied density.

To achieve these objects, an image processing method to perform half tone processing on input images using an error diffusion method according to the present invention comprises steps of: generating a sine wave where the amplitude and the frequency are modulated according to the average value of the target pixel value and the peripheral pixel values; adding the diffused quantization errors, the target pixel value and the sine wave; quantizing the addition result by a predetermined number of grayscale levels; and calculating the quantization errors of the peripheral pixels from the errors by the quantization.

An image processor which performs half tone processing on input images using an error diffusion method according to the present invention comprises a memory for storing the input image and a processing part for performing the half tone processing on the input images, wherein the processing part adds a sine wave where the amplitude and the frequency are modulated according to the average value of the target pixel value and the peripheral pixel values, the diffused quantization errors, and the target pixel value, then quantizes the addition result by a predetermined number of grayscale levels, and calculates the quantization errors of the peripheral pixels from the errors by the quantization.

A program of a storage medium for storing a program to perform half tone processing on input images using an error diffusion method according to the present invention comprises: a program for generating a sine wave where the amplitude and the frequency are modulated according to the average value of the target pixel value and the peripheral pixel values; a program for adding the diffused quantization errors, the target pixel value and the sine wave; a program for quantizing the addition result by a predetermined number of grayscale levels; and a program for calculating the quantization errors of the peripheral pixels from the errors by the quantization.

In the present invention, the amplitude and the frequency of a sine wave to be superimposed are modulated using an average value of the target pixel value and the peripheral pixel values. Since the average value indicates the level of dot density, a sine wave with amplitude and frequency according to the dot density can be superimposed. Therefore, where error diffusion is performed to maintain the grayscale levels, uniform and cyclic dot patterns, as in half tone dots, can be arranged in the low dot density area, and a high frequency dot pattern, similar to a checkered pattern, can be arranged in the high dot density area, and as a result, a visually better half tone image can be obtained.

In the image processing method according to the present invention, the step of generating a sine wave may further comprise a step of calculating the average value of the target pixel value and the peripheral pixel values, a step of calculating the difference between the target pixel value and the average value, and a step of modulating the amplitude of the sine wave by the average value and the difference. Since difference is used, the edges of the image can be detected and the effect of the sine wave can be decreased so that a forced arrangement of dots at the edges can be prevented, and clear edges can be stored. As a result, a good half tone image can be obtained, even for images with highly varied densities.

In the image processing method according to the present invention, the step of generating a sine wave may further comprise a step of independently controlling the cycle in the horizontal direction and the cycle in the vertical direction of the sine wave. Since the horizontal direction and the vertical direction are independently controlled, the sine wave functions in two dimensions, and the arrangement of dots can be controlled in two dimensions using the sine wave. As a result, a better half tone image can be obtained in a two-dimensional plane.

In the image processing method according to the present invention, the step of generating a sine wave may further comprise a step of setting different initial phases of the sine wave for the input image of each color. When color images are manipulated, dots can be forcibly distributed so that the dots of each color do not overlap, and the dots of each color can be arranged at relatively equal intervals. As a result, the spatial frequency of a half tone image can be increased, graininess can be decreased, and the color gamut expanded.

The image processing method of the present invention may further comprise a step of reading the target pixel value and the peripheral pixel values by scanning the input image in two ways, and a step of calculating the quantization errors of the peripheral pixels may further comprise a step of calculating the quantization errors using an error filter, which is selected from a plurality of error filters according to the target image value. In this aspect, the increase in calculation volume can be controlled and geometric texture can be controlled by using both two-way scanning and a small size error filter switching system.

BRIEF DESCRIPTION OF THE DRAWINGS

FIGS. 7A and 7B are diagrams depicting the amplitude calculation of the AM-FM screen function;

DESCRIPTION OF THE PREFERRED EMBODIMENTS

The embodiments of the present invention will now be described in the sequence of image processing and the AM-FM screen function with reference to the accompanying drawings.

[Image Processing]

Figure 1:
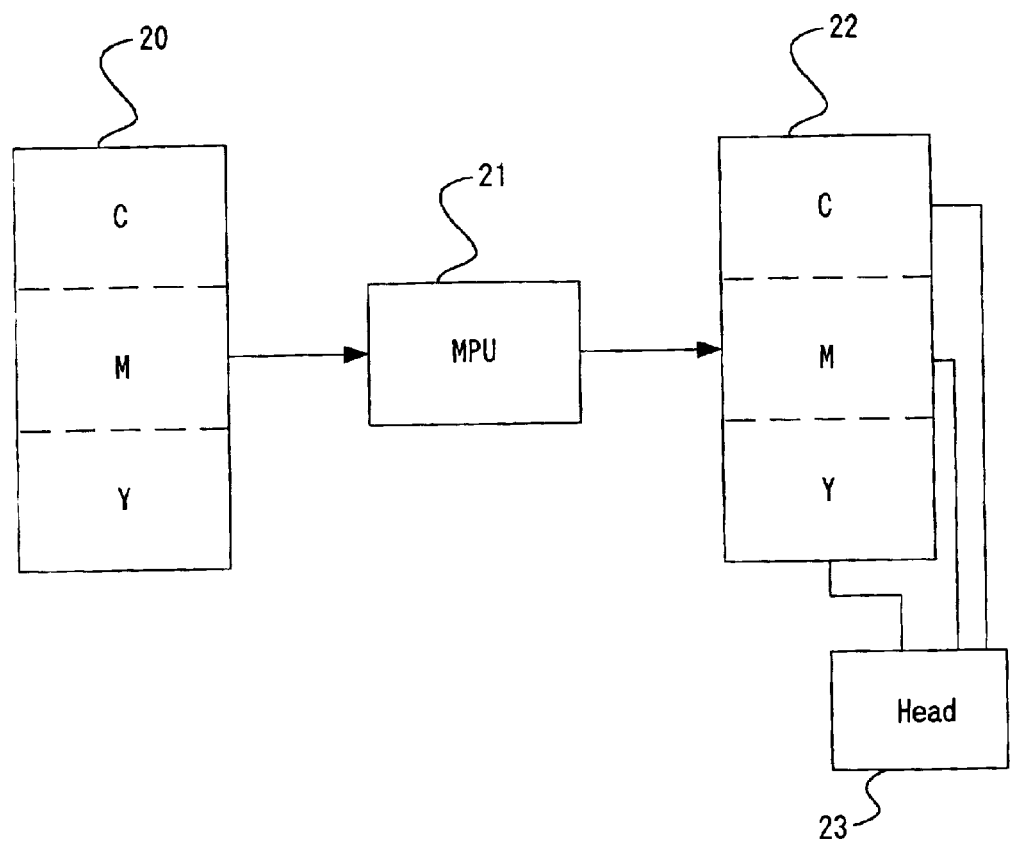
FIG. 1 is a block diagram depicting an image processor of an embodiment of the present invention.
Figure 2:
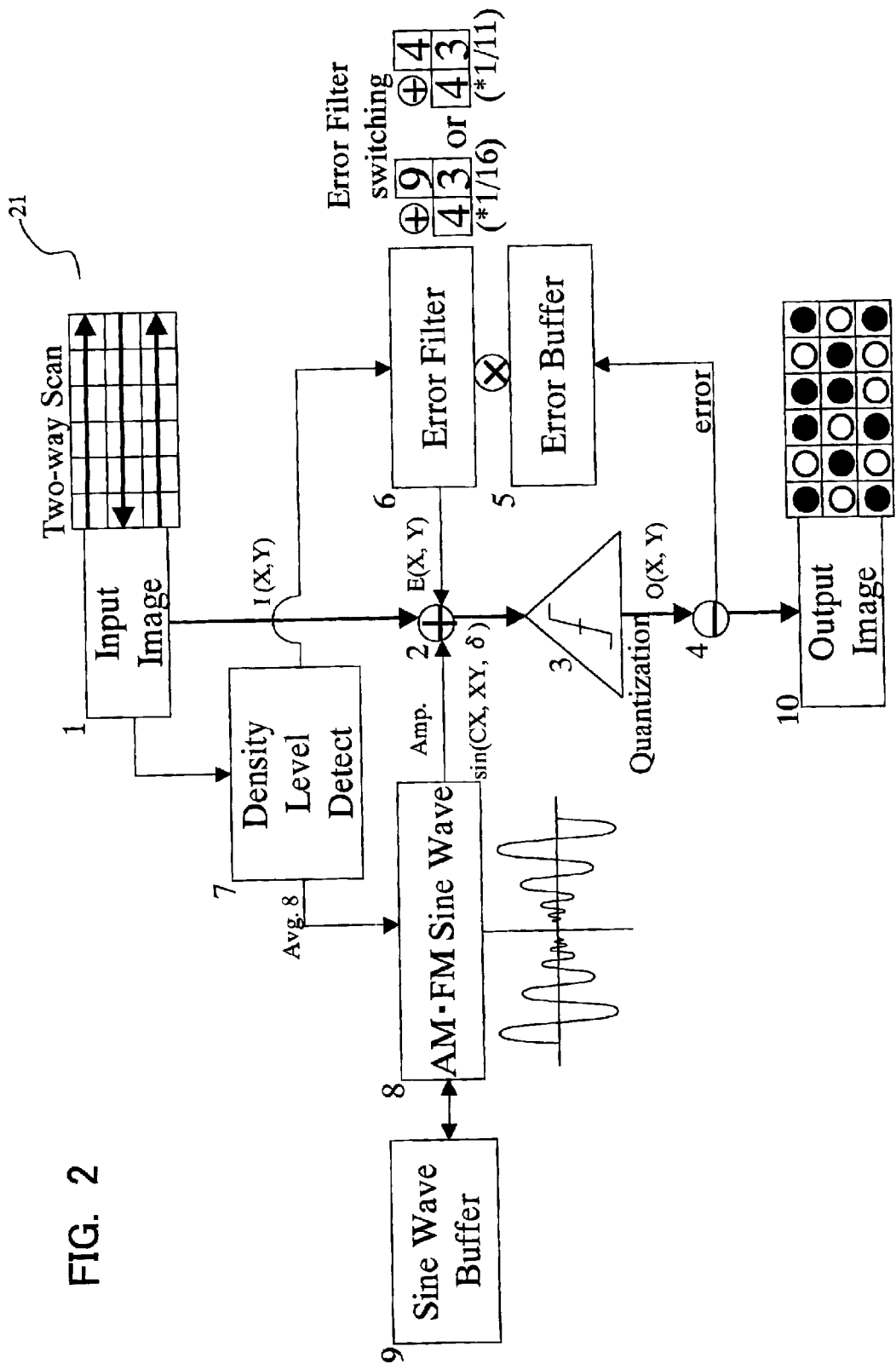
FIG. 2 is a functional block diagram depicting the image processing unit in FIG. 1.
Figure 3:
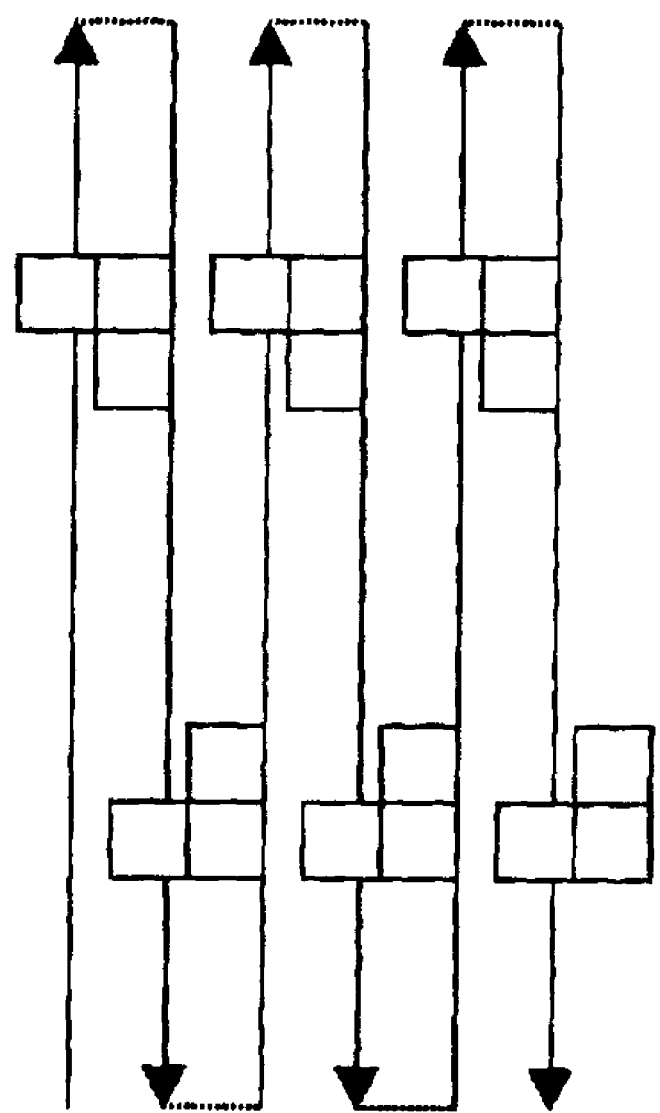
FIG. 3 is a diagram depicting the two-way scan in FIG. 2.
Figure 4:
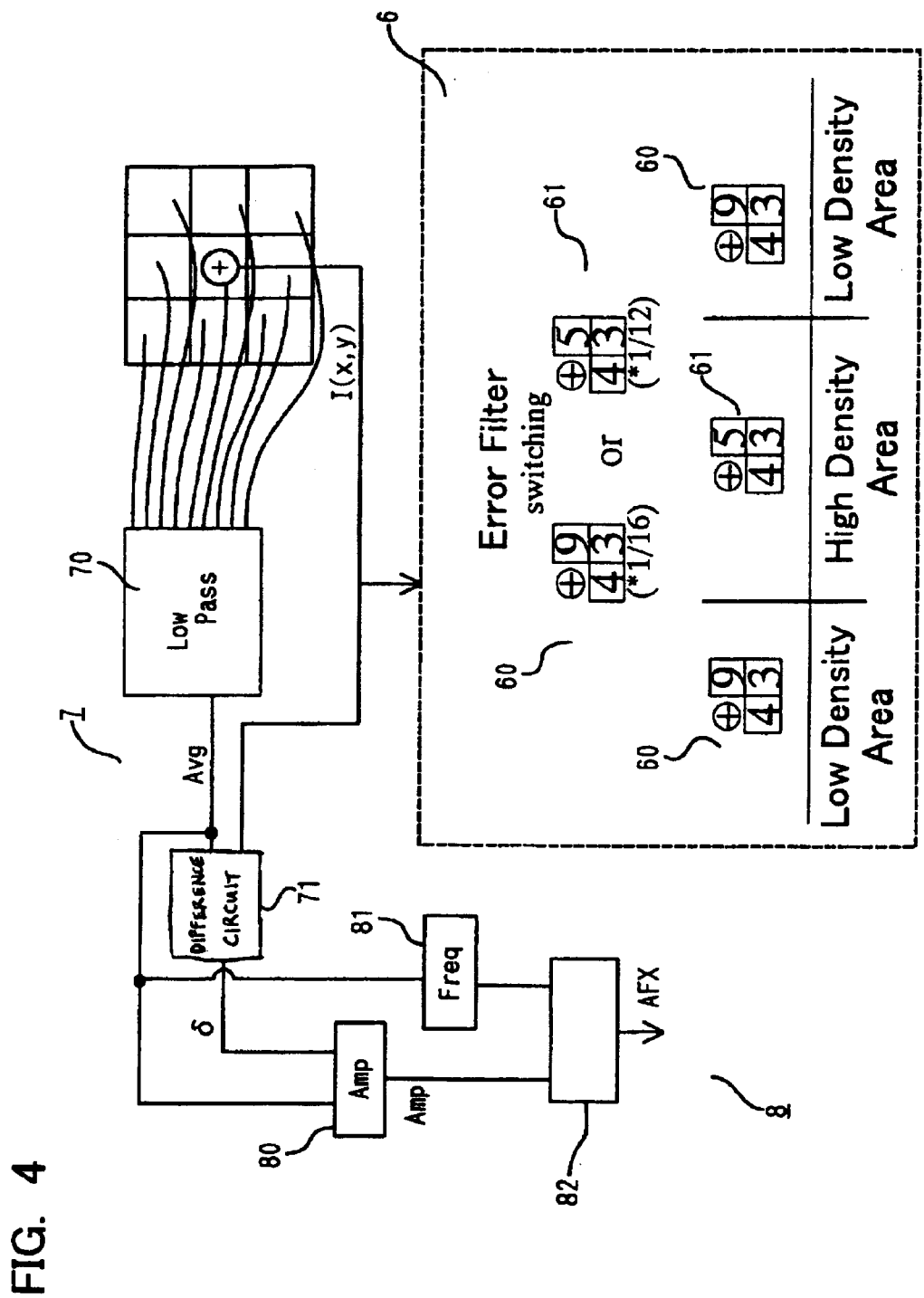
FIG. 4 is a block diagram depicting the most important part in FIG. 2.

FIG. 1 is a block diagram depicting an embodiment of the present invention, FIG. 2 is a functional block diagram of the image processor thereof, FIG. 3 is a diagram depicting two-way scanning, and FIG. 4 is a block diagram depicting a part of the image processor.

FIG. 1 is an example when the present invention is applied to a color inkjet printer, where the memory 20 stores the input image as a full color image having 0–255 density values (0: black, 255: white) in each C (cyan), M (magenta) and Y (yellow) plane. The image processing unit 21, which comprises an MPU, performs Q value quantinze processing, and the quantization threshold is set at a constant interval. For example, in the case of binary (base-2) processing, the threshold is set at the 127.5 level, and in the case of sextic (base-6) processing, the threshold is set at the 25.5, 76.5, 127.5, 178.5 and 229.5 levels.

The output memory 22 stores the half tone processed output image to the C, M and Y planes. The color inkjet head 23 jets ink drops in each color according to the output image, and prints to the printing medium, which is not illustrated. The MPU 21 processes each color of the input image for each color. The memories 20 and 22 may be constituted as one memory.

The image processing unit 21 will be described with reference to FIG. 2. In FIG. 2, '1' is an input image. '2' is an addition circuit for adding the input pixel value I and the quantization errors E determined through the error filter 6, '3' is a quantization circuit for quantizing the value after addition by the addition circuit 2 using quantization thresholds, '4' is a subtraction circuit for calculating the quantization errors, '5' is an error buffer for recording the quantization errors, '6' is an error filter where an error diffusion ratio is recorded, '7' is a density level detection circuit for detecting the values of the target pixel and the peripheral pixels in the input image, '8' is a circuit for generating the AM-FM screen function (sine wave) based on the value from the detection circuit 7, and '9' is a buffer for storing the cycle of the sine wave.

Before a description of the operation of this configuration, the two-way scanning used for this embodiment will be described. Two-way scanning is a scanning method of reciprocating scanning of each scanning line. The cause of worm generated in a low dot density area is mainly a deviation of the quantization error diffusion direction in a certain direction, but the use of this scanning method decreases worm since the dispersion of the error diffusion direction improves.

When two-way scan is used, however, fingerprint may be amplified as a side effect, so two types of small size error filters, 60 and 61, shown in FIG. 4, are provided in the error filter 6. Fingerprint can be controlled by selecting and using the small size error filters 60 and 61 according to the value detected by the detection circuit 7 in FIG. 2, that is, according to the density level of the target image value.

The error filter 60 in FIG. 4 has a characteristic which increases the uniformity of dots in a highlight area (low dot density area), and the error filter 61 has a characteristic to bring out the high frequency characteristic of dots in the mid-tone area (high dot density area). As FIG. 4 shows, the low dot density area is an area where the number of black dots is low (number of white dots is high), and an area where the number of black dots is high (number of white dots is low), for which the error filter 60 is selected. The high dot density area is the area in between, where image changes considerably. The error filter 61 is selected for this area.

By using both of the above two methods, two-way scan and small size error filter switching operation, an increase in the calculation volume can be minimized and such problems as geometric texture as worm and fingerprint can be solved.

Then during quantization processing, the AM-FM screen function (sine wave) having an amplitude and a frequency, which depends on the value obtained from the density level detection circuit 7 in FIG. 2, is calculated by the generation circuit 8, and the calculated value along with the quantization errors are superimposed on the addition circuit 2. In this way, dot patterns with low graininess, similar to half tone dots, can be obtained in the low dot density area of an output image.

Now the operation of the configuration in FIG. 2 will be described. At first, the scanning direction is determined. The first scanning direction can be in the right direction, as in a normal raster scan. Then the density level detection circuit 7 detects the density levels of the target pixel value and the peripheral values of the input image. The error filter 60 or 61 (6 in FIG. 2) to be used for the pixel value is determined according to the density level of the target pixel value detected by the circuit 7,.

According to the error filter 60 or 61, the quantization errors stored by the error buffer 5 are weighted and added by the circuit 6. Here, the average density level Avg of the target pixel value detected by the detection circuit 7 and of the peripheral pixel values 8 thereof, is calculated by the low pass filter 70 of the detection circuit 7 in FIG. 4, and the difference δ between the target pixel value I and the average density level Avg is calculated by the difference circuit 71.

Based on the average density level Avg and the difference level δ obtained there, the generation circuit 8 calculates the amplitude and the frequency of the AM-FM screen function, and determines the density level to be superimposed. As mentioned later in FIG. 4, the amplitude calculation circuit 80 calculates the amplitude from the average density level Avg and the difference level δ, and the frequency calculation circuit 81 calculates the frequency from the average density level Avg. And the function calculation circuit 82 calculates the function to be superimposed from the amplitude and the frequency.

In FIG. 2, the target pixel value I (x, y), the quantization errors obtained from the circuit 6, and the AM-FM screen function value calculated by the circuit 8, are added by the addition circuit 2. The value added by the addition circuit 2 is quantized to the level determined by the threshold of the quantization circuit 3, and the value becomes the pixel value of the output image.

The circuit 4 subtracts density level determined by the circuit 3 from the value determined by the circuit 2. The value calculated by the subtraction circuit 4 is recorded in the error buffer 5. After this operation, the target pixel value is shifted to the right by 1, and the above series of operations is repeated.

When the above series of operations is repeated until the last pixel of the main scanning line, the scanning direction of the scanning line to be processed next is reversed (in other words, from right to left), and the same operation is performed. Since operation is in the opposite direction this time, the shapes of the error filters 60 and 61 in 6 are also reversed.

[AM-FM Screen Function]

The amplitude characteristic and the frequency characteristic of the AM-FM screen function will now be described. At first, the amplitude (hereafter Amp) characteristic of the AM-FM screen function will be described with reference to FIG. 5 to FIG. 10. For the amplitude Amp, the average value (hereafter Avg) of the peripheral 9 pixels using the low pass filter 70 in the detection circuit 7, and the amplitude Amp are controlled using the average value. The AM-FM screen function is set such that the amplitude is high in the low dot density area, and is low in the high dot density area.

Figure 5A:
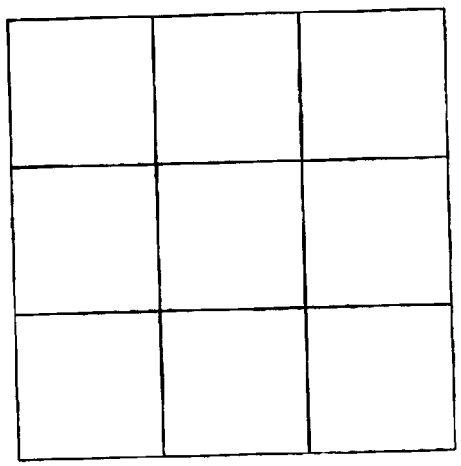
FIGS. 5A, 5B and 5C are diagrams depicting the dot density of the present invention.
Figure 5B:
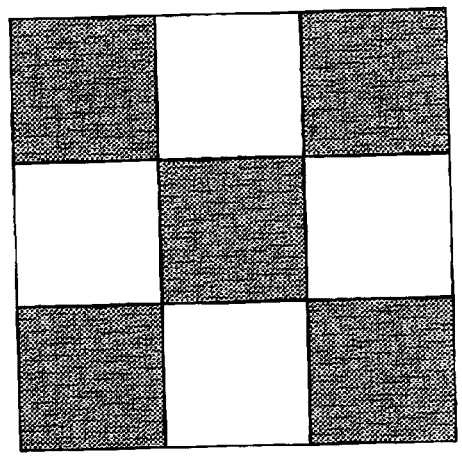
Figure 5C:
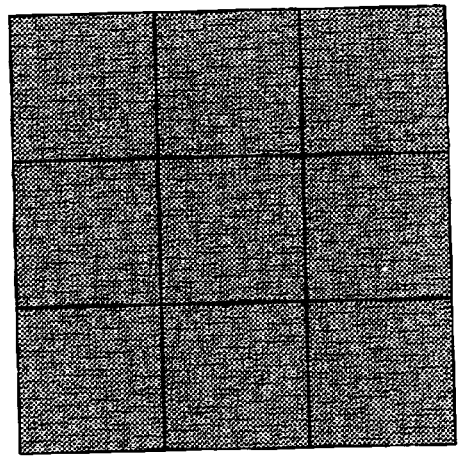
Figures 6A, 6B:
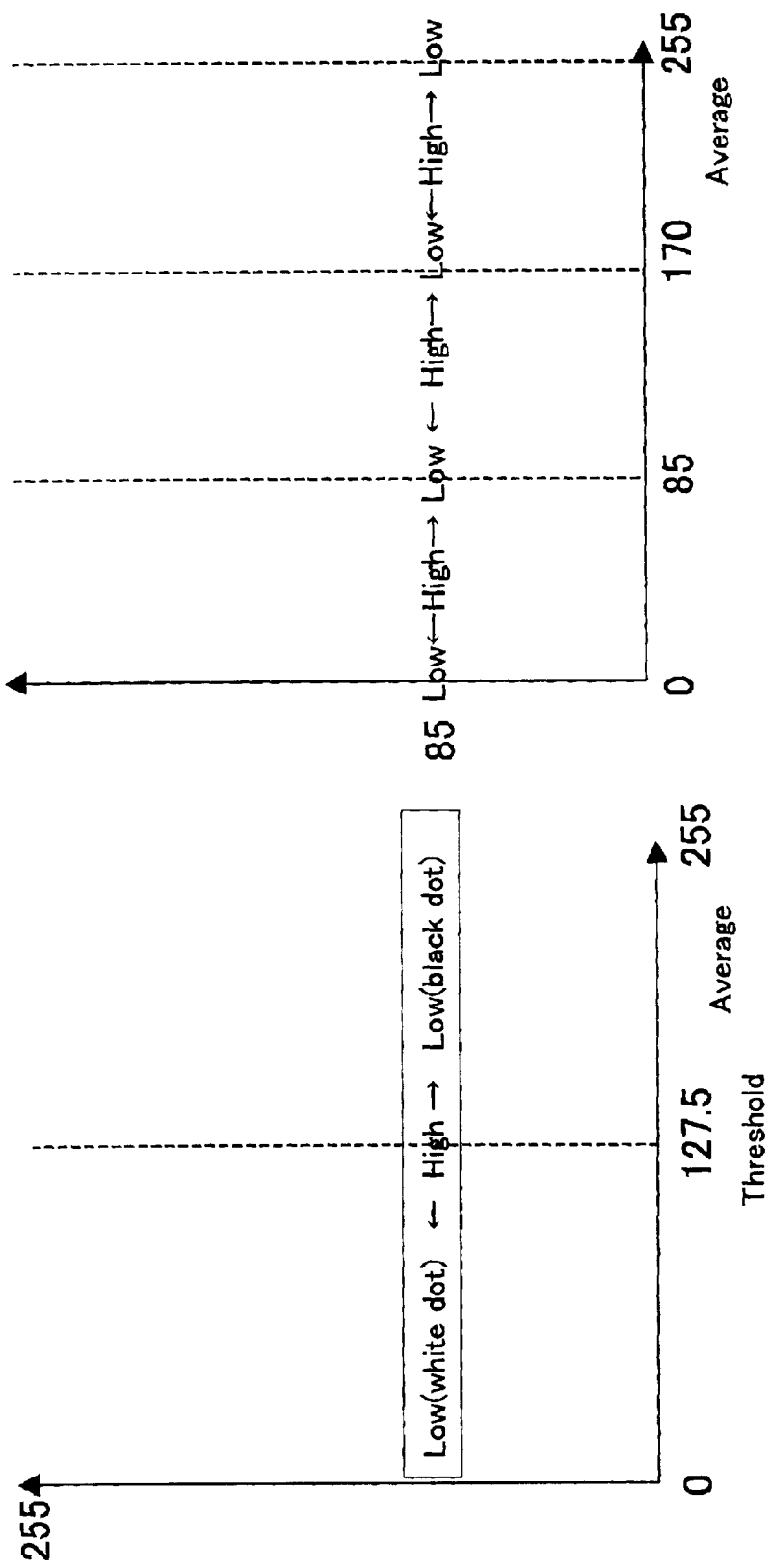
FIGS. 6A and 6B are diagrams depicting the relationship between the average value and the dot density.

As FIG. 6A shows, binary processing where Q is "2" is used as an example for the description, the number of black dots is less as the average value becomes greater than the threshold, and this is defined as a low dot density area. FIG. 5A shows this state in a 3×3 matrix. The number of white dots is less as the average value becomes smaller than the threshold, and this is also defined as a low dot density area. This is shown in FIG. 5C. When the average value is near the threshold, black and white dots coexist, as shown in FIG. 5B. This is defined as a high dot density area. FIG. 6B shows the case of quaternary (base-4) processing.

The amplitude of the AM-FM screen function indicates the intensity to with which dots are corrected and arranged dots in a highlight part (low dot density area). If the amplitude of the sine wave is simply determined according to the intensity of the input level, the edges of the output image may become unclear. So the difference δ between the target pixel value and the value calculated by the low pass filter 70 is used, and the difference is also set as the amplitude parameter of the sine wave. By controlling the amplitude in this way, clear edges are maintained and the dispersion of dots becomes more stable.

The amplitude Amp is given by the following formula.

$$Amp = C(\text{constant}) \cdot (mod(Avg, 255/(Q-1)) - 255/2(Q-1))\gamma/(\delta^4 + 1) \quad (1)$$

Here mod (a, b) is a remainder when 'a' is divided by 'b'.

This amplitude formula is a general formula when Amp becomes higher in the low dot density area and lower in the high dot density area in Q value quantize processing, and the amplitude can be easily controlled by one formula.

Figure 8B:
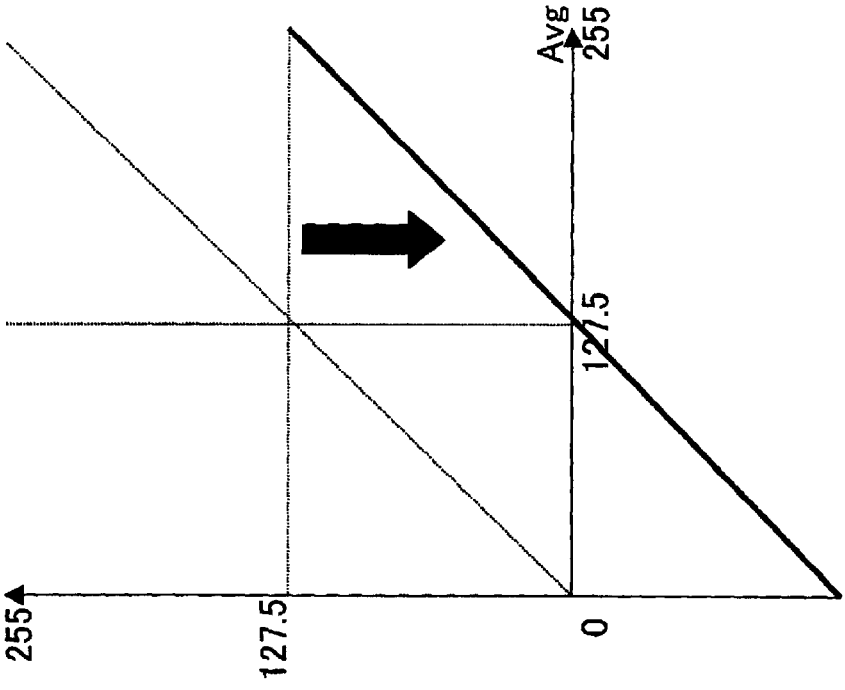
FIGS. 8A and 8B are diagrams depicting the operation of the amplitude calculation of the AM-FM screen function.
Figure 8A:
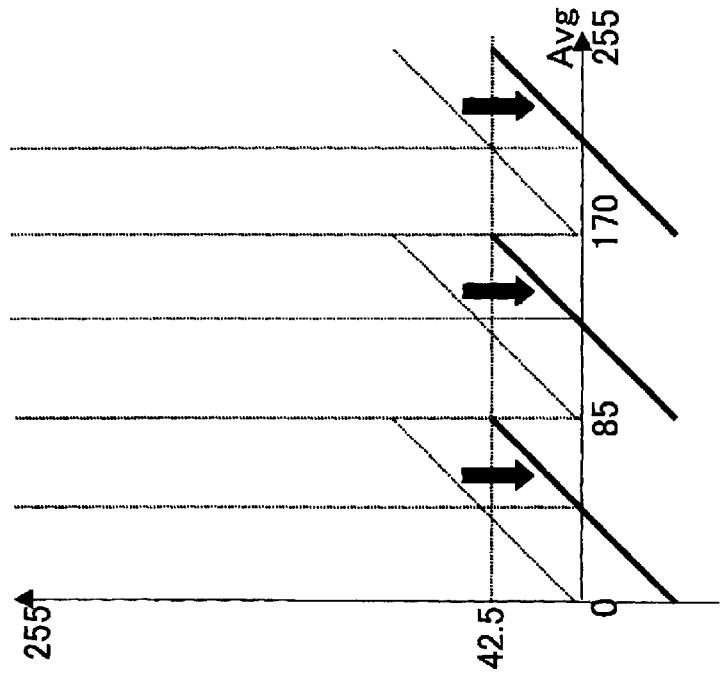
Figure 9A:
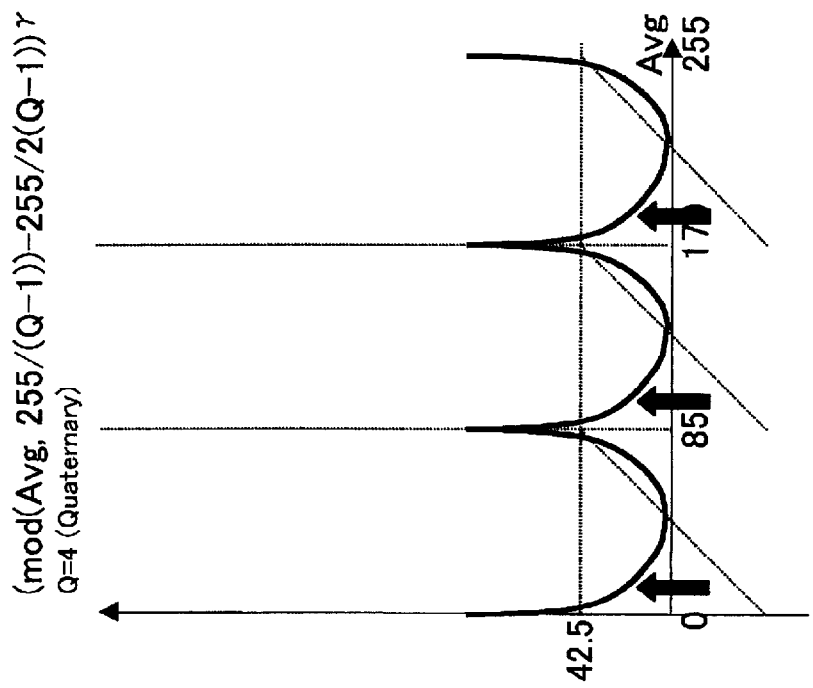
FIGS. 9A and 9B are diagrams depicting the amplitude control of the AM-FM screen function.
Figure 9B:
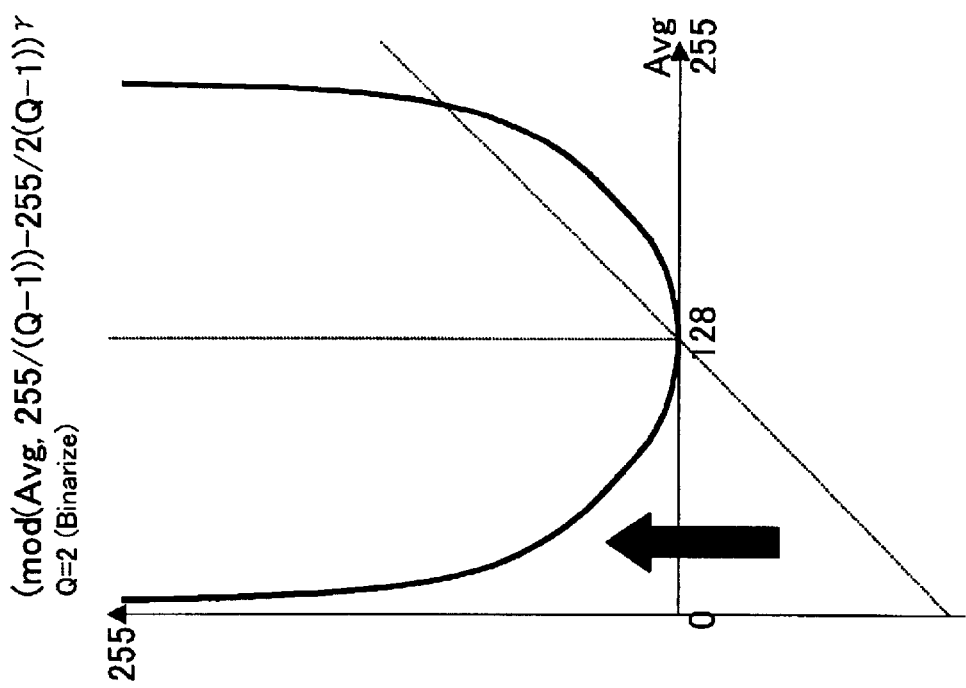
Figure 10:
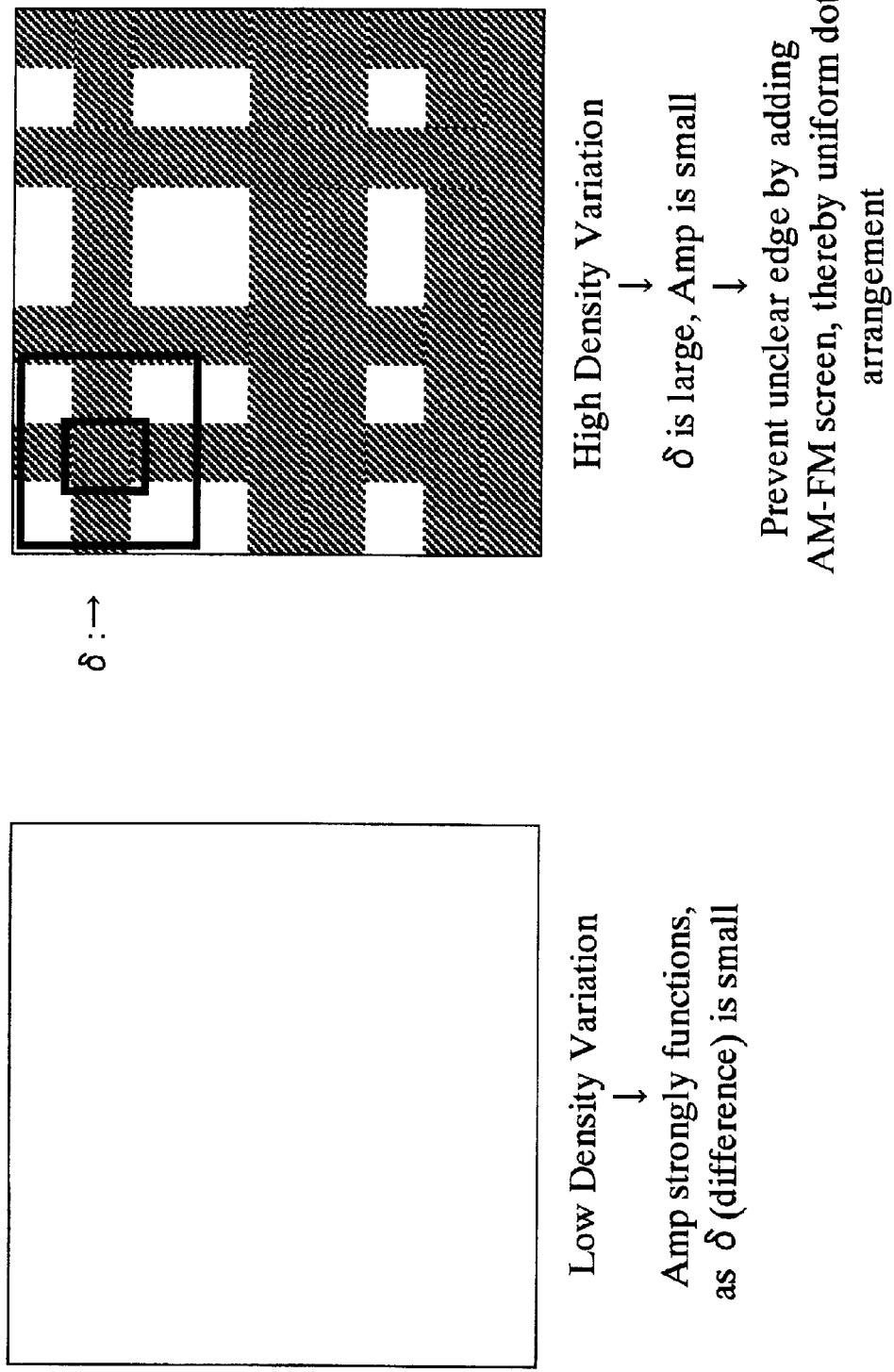
FIG. 10 is a diagram depicting the operation of the amplitude control of the AM-FM screen function.

The meaning of this formula will be described with reference to FIG. 7 to FIG. 10. FIG. 7A shows the relationship between the average value Avg and the remainder mod when binary processing (that is, Q=2) is performed. FIG. 8A shows the relationship between the average value Avg and mod (Avg, 255/(Q−1))−255/2 (Q−1). When a power method is used, the formula indicates the relationship between the average value Avg and the power value (mod (Avg, 255/(Q−1))−255/2 (Q−1))γ, as shown in FIG. 9A. Therefore, the amplitude which is to be the high amplitude in the low dot density area and the amplitude which is to be the low amplitude in the high dot density area are obtained from the average value (hereafter Avg). In the formula (1), the power value is divided by ($\delta^4$+1), which is in proportion to the difference δ. As FIG. 10 shows, the amplitude Amp in the formula (1) is high in a part where the density variation is low, since δ is small. In other words, the function of the sine wave is robust, and the result of dot dispersion is strongly expressed. In a part where the density variation is high, the difference δ increases, and the amplitude Amp in the formula (1) decreases. Therefore, by adding the AM-FM screen function, unclear edges can be prevented, and dots can be arranged more uniformly.

FIG. 7B shows the relationship between the average value Avg and the remainder mod when quaternary processing (that is Q=4) is performed. FIG. 8B shows the relationship between the average value Avg and mod (Avg, 255/(Q−1))−255/2 (Q−1). When a power method is used, the formula indicates the relationship between the average value Avg and the power value (mod (Avg, 255/(Q−1))−255/2 (Q−1))γ as shown in FIG. 9B. Therefore, the amplitude which is to be the high amplitude in the low dot density area and the amplitude which is to be the low amplitude in the high dot density area are obtained from the average value (hereafter Avg) in the same way. In the formula (1), the power value is divided by ($\delta^4$+1), which is in proportion to the difference δ. As FIG. 10 shows, the amplitude Amp in the formula (1) is high in a part when density variation is low, since δ is small. In other words, the function of the sine wave is robust, and the result of dot dispersion is strongly expressed. In a part where density variation is high, the difference δ increases, and the amplitude Amp in the formula (1) decreases.

Figure 11:
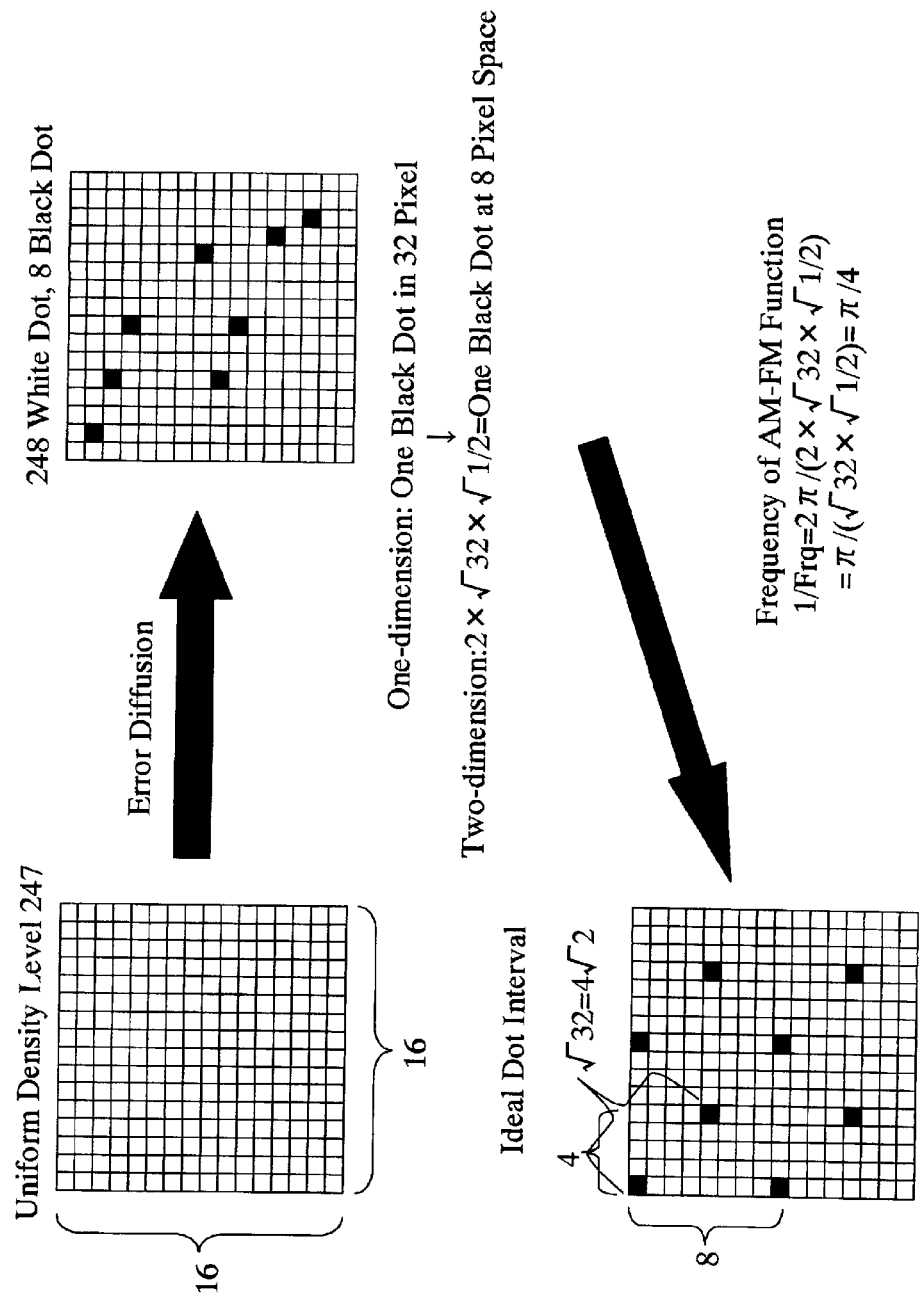
FIG. 11 is a diagram depicting the frequency calculation of the AM-FM screen function.

Now the frequency Frq of the AM-FM screen function will be described with reference to FIG. 11 to FIG. 14. The frequency also depends on the input pixel value obtained by the detection circuit 7. The frequency is strongly correlated with the ideal dot interval in the target pixel value. For example, as FIG. 11 shows, the input value of 16×16 pixels with uniform density level 247 is binarized by error diffusion. In this case, there are 8 black dots in 256 pixels as a result of error diffusion.

In one-dimensional terms, 8 in 256 pixels means that one black dot appears at every 32 pixels. In two-dimensions, a square root is found, that is, black dots are arranged at an interval of average [square root sign] 32=4 [square root sign] 2 pixels, and this is an ideal interval of black dots in a two-dimensional space.

Considering that a 45° dot arrangement is most comfortable for humans to view, dots are arranged in this way, then the dot interval in the horizontal and the vertical direction is 4 [square root sign] 2×[square root sign] 1/2×2=8, and one black dot is arranged at every 8 pixels.

In other words, in the level 247, the cycle (1/Frg) of the AM-FM screen function is 2π/8=π/4, and at quantization processing black dots are trapped according to this cycle. Since black dots are dispersed on a white background in the highlight part, the control of black dots should be a primary consideration, and since white dots are dispersed on a black background in the shadow part, the control of white dots should be a primary consideration as well.

Given these considerations, frequency is used depending on the input pixel value as in the following general formula in a C language program.

If mod (Avg, 255/(Q−1))−255/2(Q−1)>=0

$$Frq = \sqrt{(1/2)} \cdot \frac{}{\sqrt{[255/(Q-1)]/[255/(Q-1) - mod(Avg, 255/(Q-1))]}/\pi} \quad (2)$$

else $$Frq = \sqrt{(1/2)} \cdot \sqrt{[255/(Q-1)]/mod(Avg, 255/(Q-1))}/\pi \quad (3)$$

Figure 12:
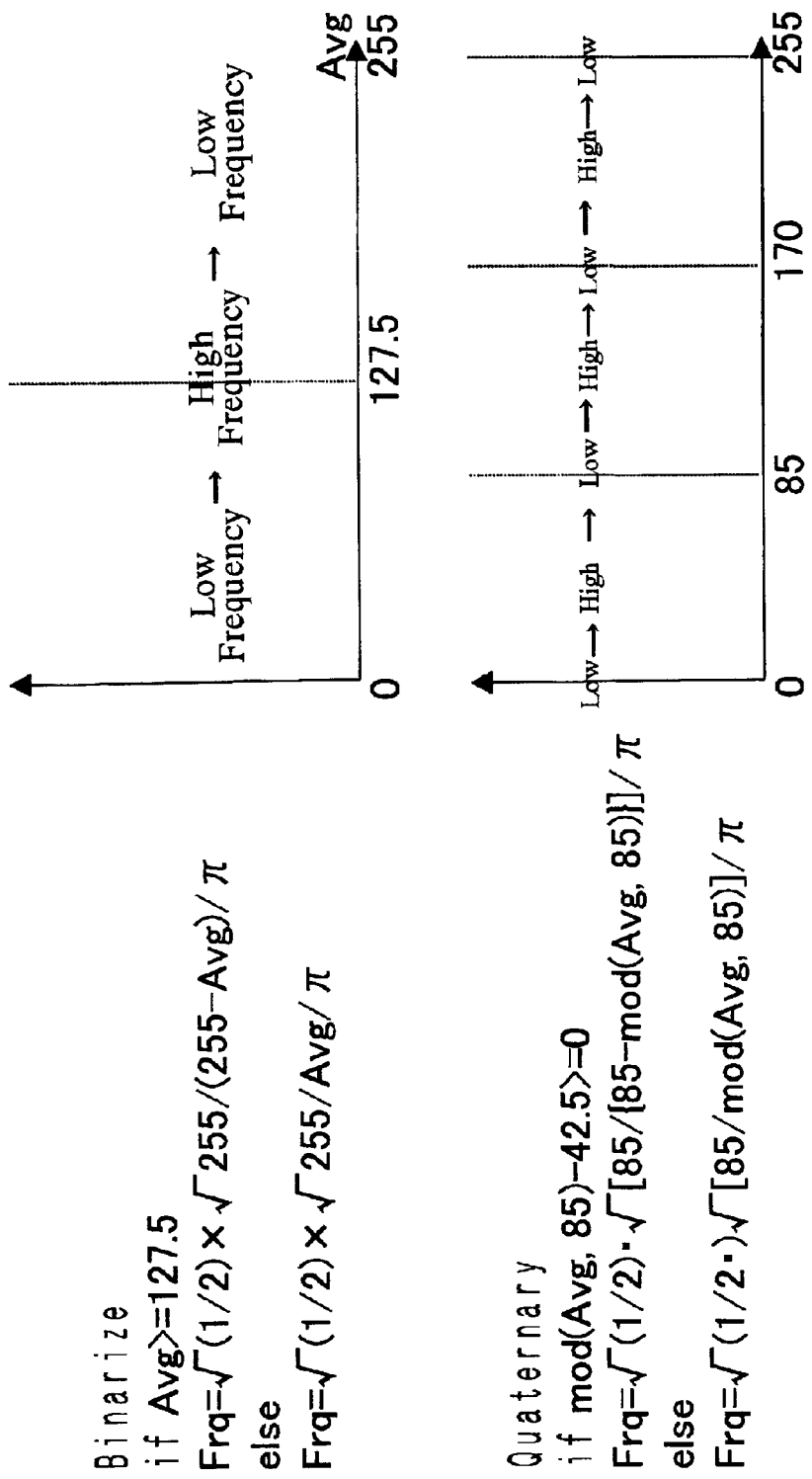
FIG. 12 is a diagram depicting the frequency calculation of the AM-FM screen function.

FIG. 12 shows the relationship between the average value and the frequency in the case of binary processing, and in the case of quaternary processing. In other words, high frequency is set in the high dot density area, and low frequency is set in the low dot density area. As a result, the cycle of the AM-FM screen function becomes 1/Frg.

Here the cycle of the AM-FM screen function is considered two-dimensionally. If the cycle in the horizontal direction is cx (=1/Frq$_x$), and the cycle in the vertical direction is cy (=1/Frq$_y$), then the AM-FM screen function (AF (x, y)) is given by the following formula.

$$AF(x, y) = Amp \cdot \sin(cx + cy + \delta) \quad (\delta: \text{initial phase}) \quad (4)$$

Therefore the AM-FM screen function indicates the high amplitude and the low frequency in the low dot density area, and the low amplitude and the high frequency in the high dot density area. If only cx is incremented in one pixel unit at the same time as error diffusion processing, then AF (x, y) becomes a one-dimensional oscillation, as shown in FIG. 13, and changes in the main scanning direction.

In this state, however, a component of the sine wave in the vertical direction disperses. So two-dimensional control is required. For this, cy must also be incremented. However, if cx and cy are incremented simultaneously, AF (x, y) will be different from the intended waveform. In order to appropriately control the AM-FM screen function in a two-dimensional space, the horizontal increment and the vertical increment are alternately switched so as to perform pseudo-two-dimensional control.

Figure 13:
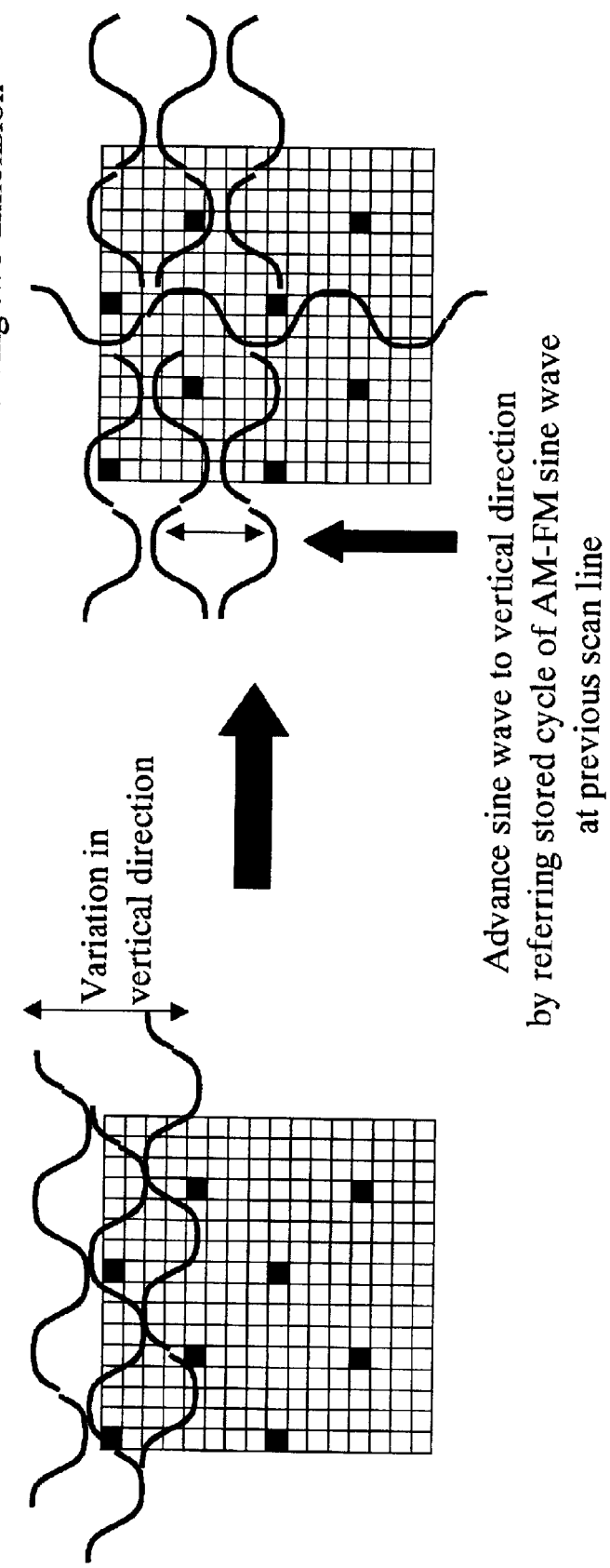
FIG. 13 is a diagram depicting the two-dimensional control of the AM-FM screen function.

In other words, the switching conditions are to switch at a predetermined pixel interval, and to switch when the edges of the image in the vertical direction are generated, as shown in FIG. 13. When these conditions are met, the progress of the sine wave is reset, cy is incremented, and the sine wave progresses in the vertical direction. To perform this switching processing, a cycle of a sine wave of one previous scanning line recorded in the memory circuit 9 in FIG. 2 is used.

Figure 14:
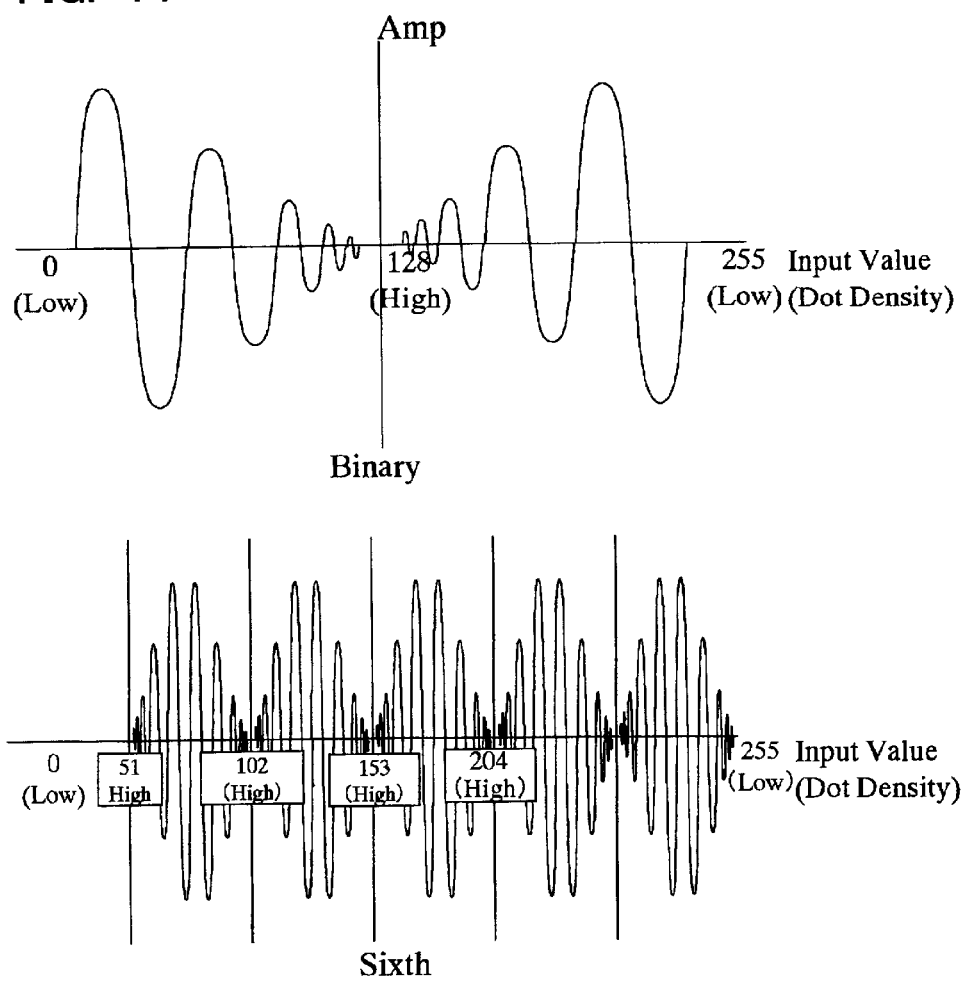
FIG. 14 is a diagram depicting the amplitude and the frequency control of the AM-FM screen function.

As a result of these two switching conditions, the AM-FM screen function behaves two-dimensionally according to the density variation of the image. As FIG. 14 shows, the AM-FM screen function becomes the high amplitude and the low frequency in the low dot density area, and the low amplitude and the high frequency in the high dot density area.

Figure 15:
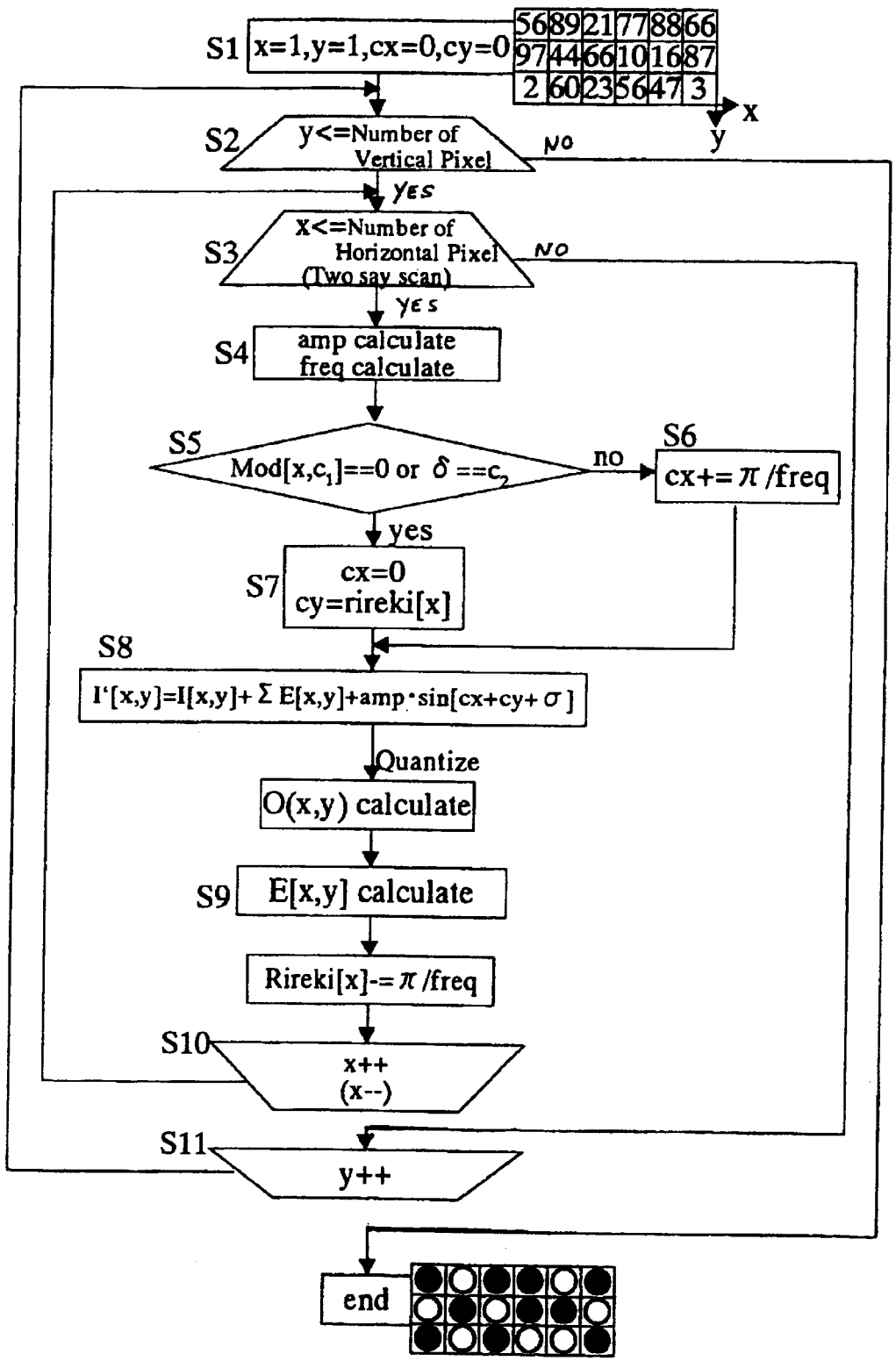
FIG. 15 is an image processing flowchart of an embodiment of the present invention.

FIG. 15 is a flowchart depicting half tone processing according to an embodiment of the present invention to perform the control.

(S1) Addresses x and y of the target pixel are initialized to "1". The cycles cx and cy of the screen function are initialized to "0".

(S2) Whether y is the number of vertical pixels or less is judged. Processing ends if y exceeds the number of vertical pixels.

(S3) Whether x is the number of horizontal pixels or less is judged. Processing advances to step S11 if x exceeds the number of horizontal pixels.

(S4) Amplitude Amp is calculated from the above formula (1), and the frequency freq is calculated from the formulas (2) and (3).

(S5) To judge the above mentioned switching conditions in the vertical direction, mod (x, c1) is calculated, and whether the calculated value is "0" is judged. c1 is the above mentioned predetermined interval in the horizontal direction. Also, whether the difference $\delta$ is "0" is judged.

(S6) If neither is "0", switching is not performed, so that $\pi$/freq is added to the cycle cx in the formula (4).

(S7) If either is "0", the above mentioned switching conditions are met, so switching to the vertical direction is performed. In other words, cx is set to "0", progress in the horizontal direction is stopped, and the cycle rireki (x) of the sine wave of one previous scanning is set to cy.

(S8) Then the AM-FM screen function value is calculated using the formula (4), and the calculated value along with the quantization errors E from the peripheral pixels are added to the target pixel value I. Then quantization processing is performed and the output O is calculated.

(S9) The quantization errors E, generated at that time, are calculated and recorded in the error buffer. Also $\pi$/freq is stored in the cycle rireki (x).

(S10) x is incremented and processing returns to step S3.

(S11) y is incremented and [processing] returns to step S2. By the error diffusion and the AM-FM screen function in the above serial processing, the dot pattern of the output image can be appropriately controlled.

Figure 16:
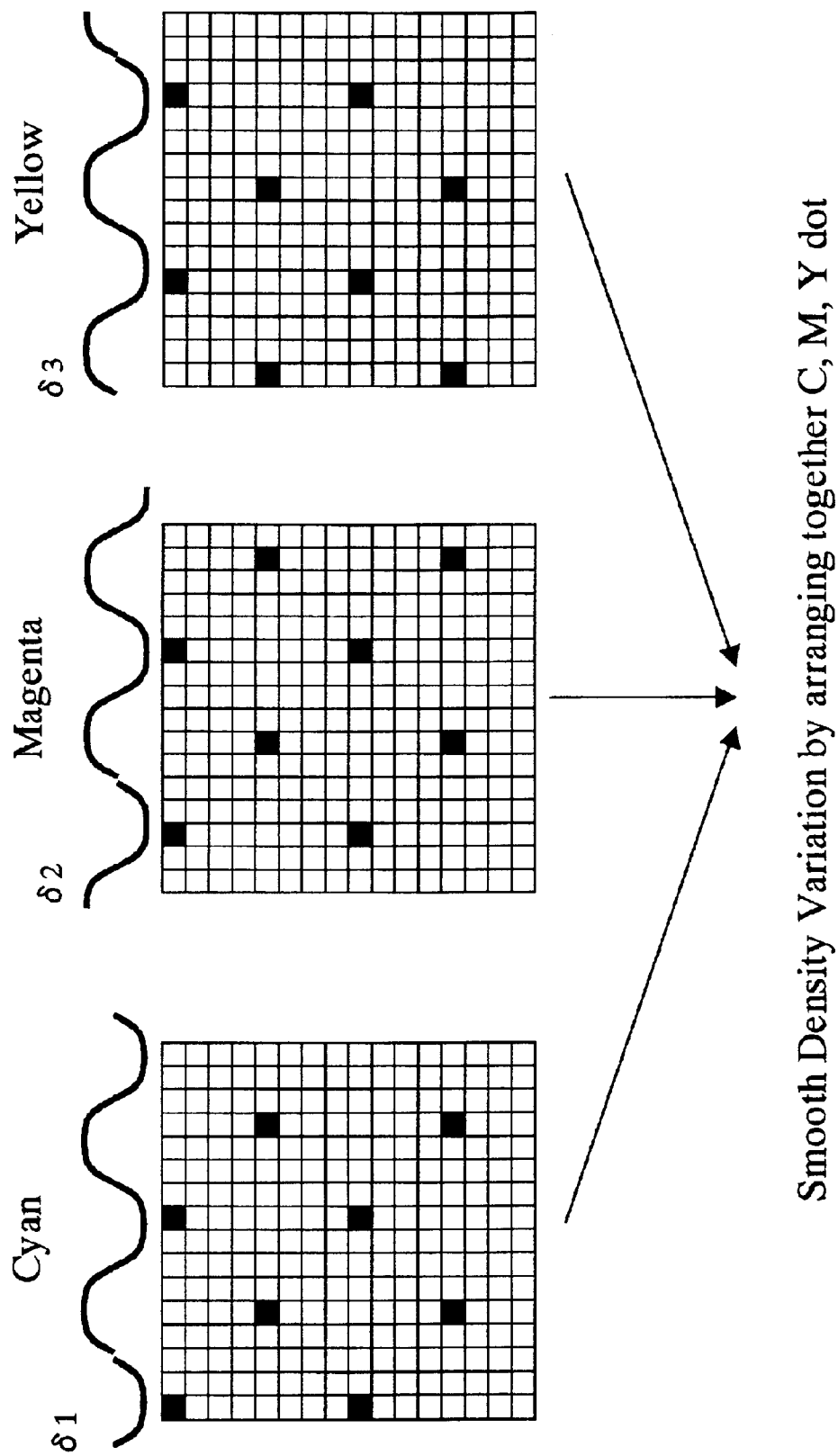
FIG. 16 is a diagram depicting color image processing of an embodiment of the present invention.
Figure 17:
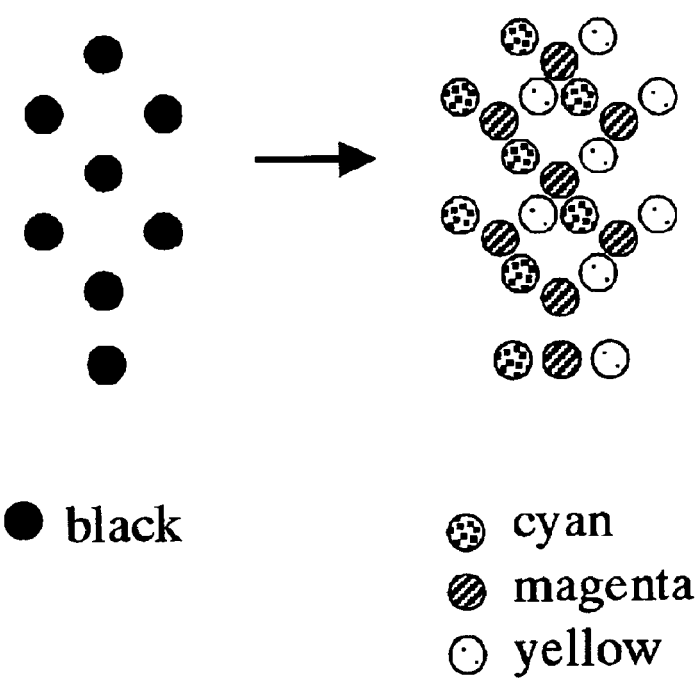
FIG. 17 is a diagram depicting the color image processing in FIG. 16.

In the case of a color image, the initial phases ($\delta$ in the formula (4)) of the sine wave in each C, M and Y plane are set to different values, $\delta 1$, $\delta 2$ and $\delta 3$, as shown in FIG. 16, so that the primary color dots of C, M and Y can be arranged together at relatively equal intervals. As FIG. 17 shows, arranging C, M and Y dots together increases the spatial frequency components of the half tone image, graininess decreases as a result, and the color gamut expands by mixing the colors of dots.

Figure 18:
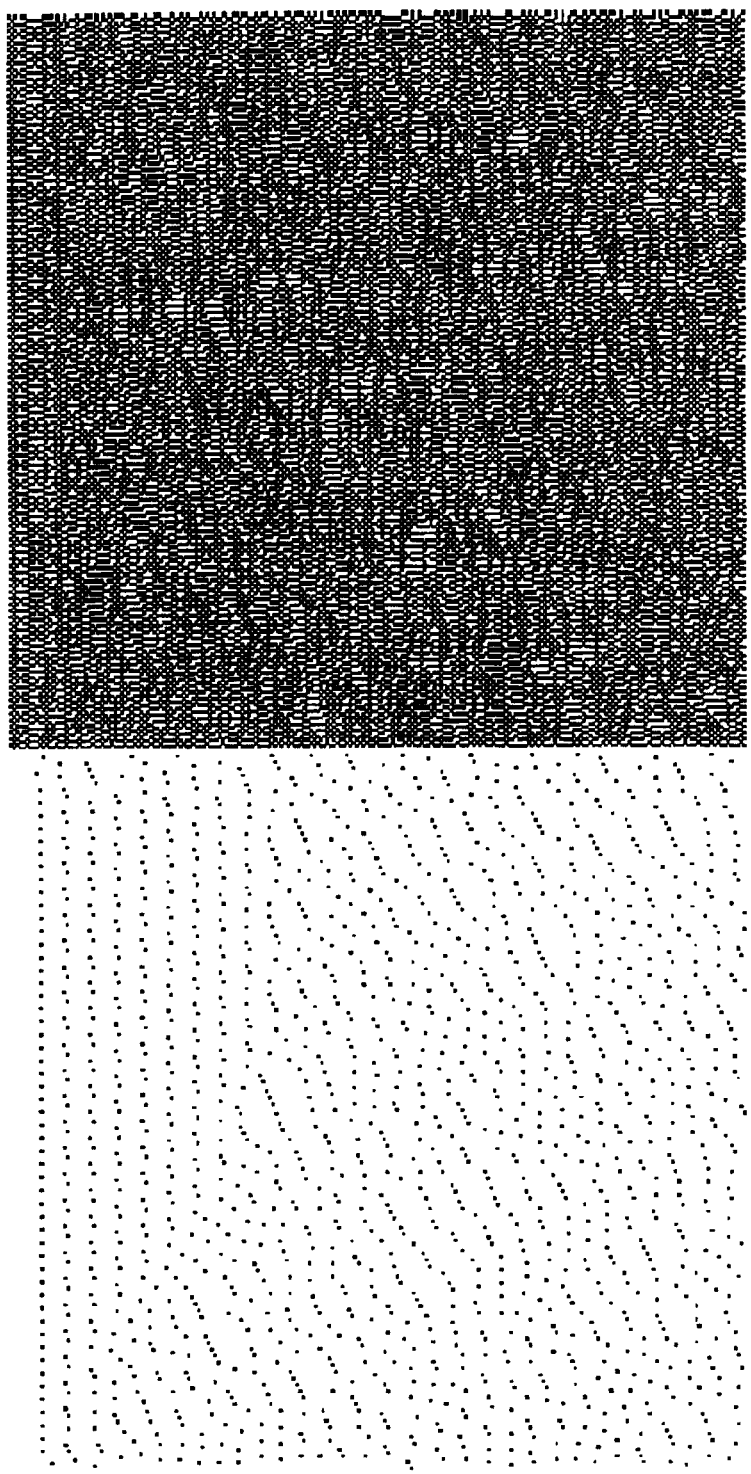
FIG. 18 is a diagram depicting an output pattern of a comparison example.
Figure 19:
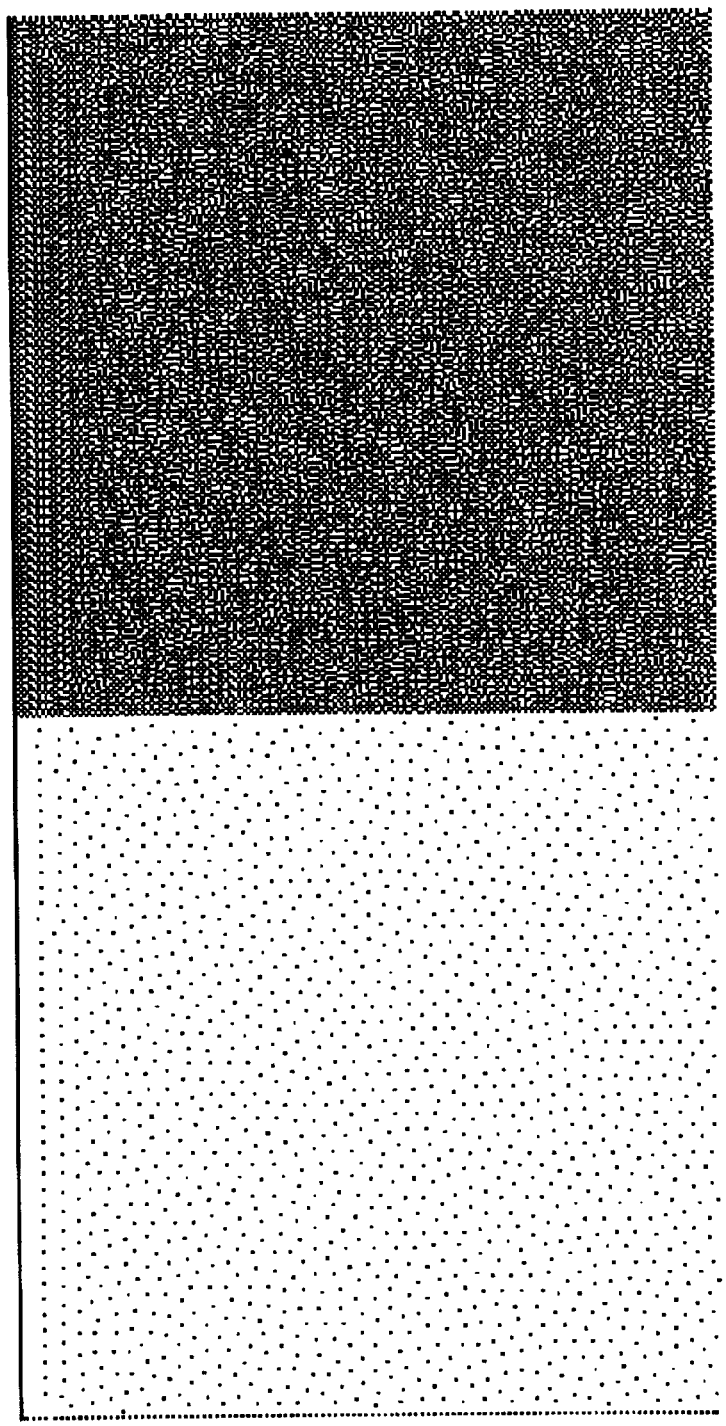
FIG. 19 is a diagram depicting an output pattern of another comparison example.
Figure 20:
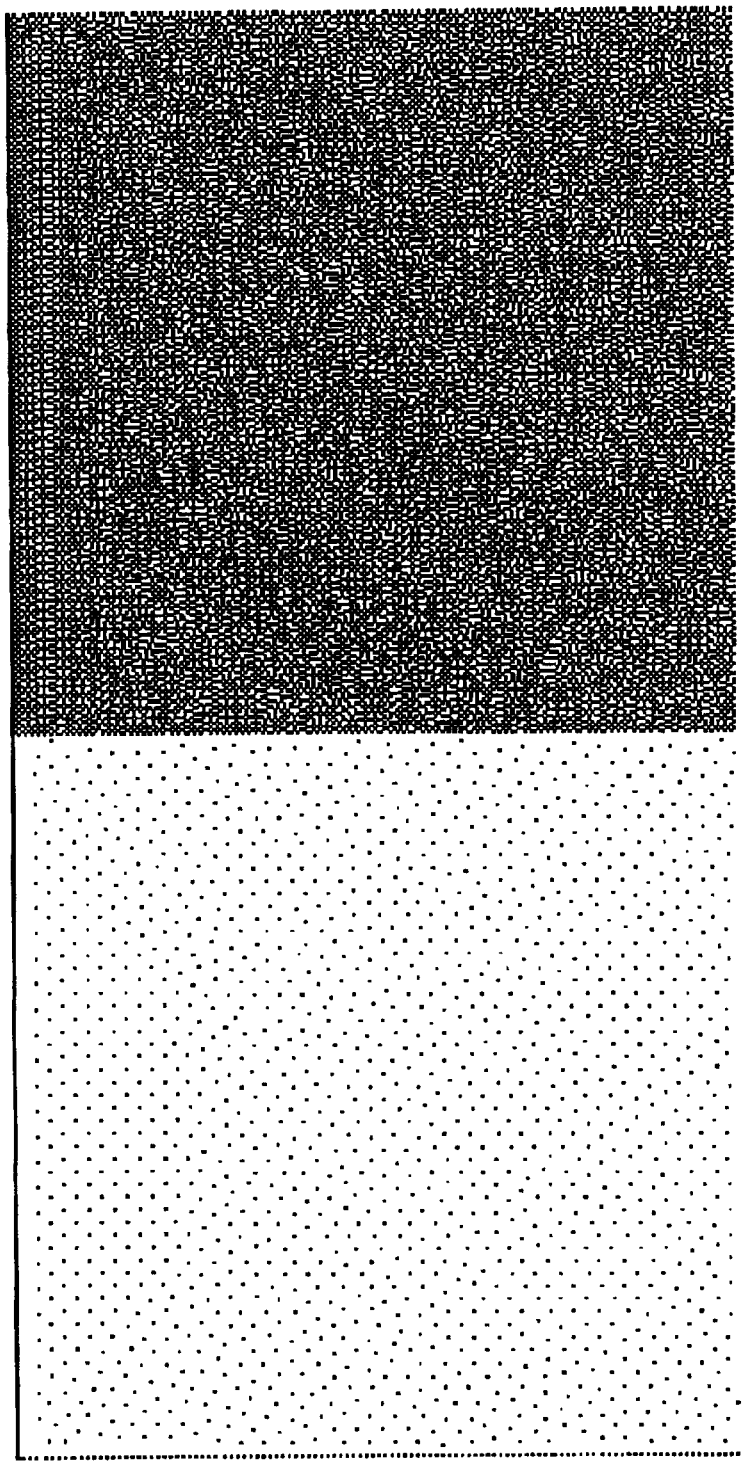
FIG. 20 is a diagram depicting an output pattern of an embodiment of the present invention.

Embodiment will be explained next. FIG. 18 is a diagram depicting an output pattern of a comparison example using the Floyd error diffusion method, FIG. 19 is a diagram depicting an output pattern of a comparison example when two-way scan and error filter switching are used, and FIG. 20 is a diagram depicting an output pattern when the AM-FM screen function is added to the case in FIG. 19 according to the present invention. In the comparison example in FIG. 19, worm at the left and fingerprint at the right in FIG. 18 are improved compared with the comparison example in FIG. 18. In the output image according to the present invention in FIG. 20, dot patterns with less graininess, quite similar to half tone dots, can be obtained in the low dot density area compared with the dot patterns obtained by the comparison example in FIG. 19.

The present invention has been described with the embodiment above, but various variant forms are possible within the scope of the present invention, and these are not excluded from the scope of the present invention.

In the present invention, the amplitude and the frequency of the sine wave to be superimposed are modulated using the average value of the target pixel value and the peripheral pixel values. Since the average value indicates high/low dot density, a sine wave with the amplitude and the frequency according to the dot density can be superimposed. Therefore, even if errors are diffused to maintain grayscale levels, a dot pattern which is uniform and cyclic, such as half tone dots, can be arranged in a low dot density area, and a high frequency dot pattern, which is closer to checkers, can be arranged in a high dot density area, and as a result, a visually fine half tone image can be obtained.

What is claimed is:

1. An image processing method for performing half tone processing on input images using an error diffusion method, comprising the steps of:

generating a sine wave in which the amplitude and the frequency are modulated according to the average value of a target pixel value and the peripheral pixel values;

adding quantization errors, said target pixel value and said sine wave;

quantizing said addition result by a predetermined number of grayscale levels; and calculating the quantization errors of said peripheral pixels from errors by said quantization.

2. The image processing method according to claim 1, wherein said step of generating a sine wave further comprises the steps of;

calculating the average value of said target pixel value and said peripheral pixel values;

calculating the difference between said target pixel value and said average value; and modulating the amplitude of said sine wave using said average value and said difference.

3. The image processing method according to claim 1, wherein said step of generating a sine wave further comprises a step of independently controlling the cycle in the horizontal direction and the cycle in the vertical direction of said sine wave.

4. The image processing method according to claim 1, wherein said step of generating a sine wave further comprises a step of setting different initial phases of said sine wave for the input image of each color.

5. The image processing method according to claim 1, further comprising a step of scanning said input image in two directions and reading said target pixel value and said peripheral pixel values, wherein said step of calculating the quantization errors of the peripheral pixels further comprises a step of calculating said quantization errors using an error filter which is selected from a plurality of error filters according to said target image value.

6. An image processor which performs halftone processing on an input image using an error diffusion method, said image processor comprising:

a memory for storing said input images; and a processing part for performing said half tone processing on said input image, wherein said processing part adds a sine wave in which the amplitude and the frequency are modulated according to the average value of the target pixel value and the peripheral pixel values, diffused quantization errors, and said target pixel value, then quantizes the addition result by a predetermined number of grayscale levels, and calculates the quantization errors of said peripheral pixels from errors by said quantization.

7. The image processor according to claim 6, wherein said processing part calculates the average value of said target pixel value and said peripheral pixel values, calculates the difference between said target pixel value and said average value, and modulates the amplitude of said sine wave using said average value and said difference.

8. The image processor according to claim 6, wherein said processing part independently controls the cycle in the horizontal direction and the cycle in the vertical direction of said sine wave.

9. The image processor according to claim 6, wherein said processing part sets different initial phases of said sine wave for the input image of each color.

10. The image processor according to claim 6, said processing part scans said input image in two directions and reads said target pixel value and said peripheral pixel values, and calculates said quantization errors using an error filter which is selected from a plurality of error filters according to said target image value.

11. A storage medium for storing a program to perform halftone processing on an input image using an error diffusion method, wherein said program comprises:

a program for generating a sine wave in which the amplitude and the frequency are modulated according to the average value of the target pixel value and the peripheral pixel values;

a program for adding diffused quantization errors, said target pixel value and said sine wave;

a program for quantizing addition result by a predetermined number of grayscale levels; and a program for calculating the quantization errors of said peripheral pixels from errors by said quantization.

* * * * *